United States Patent Office 3,512,497
Patented May 19, 1970

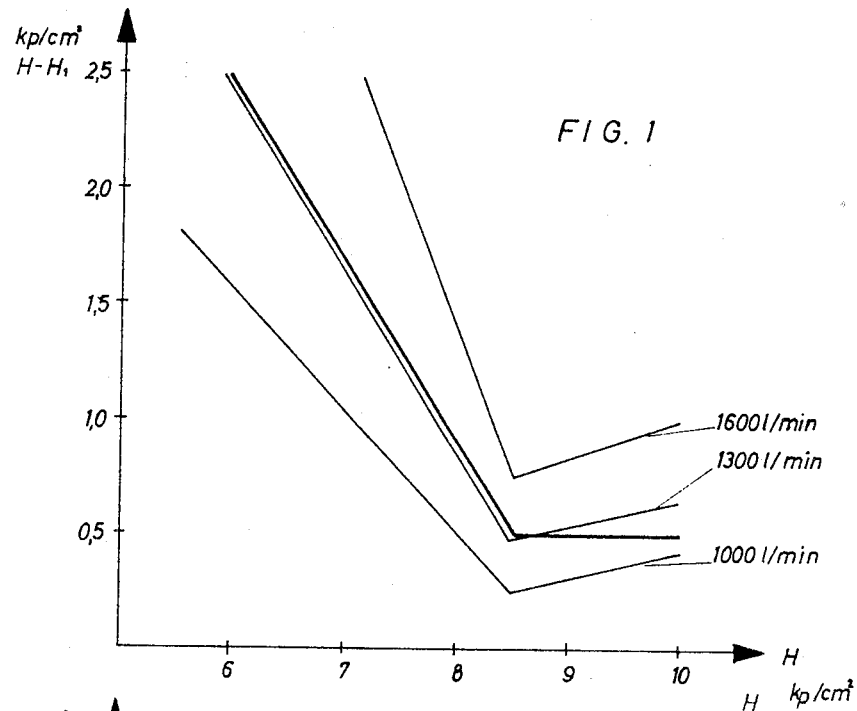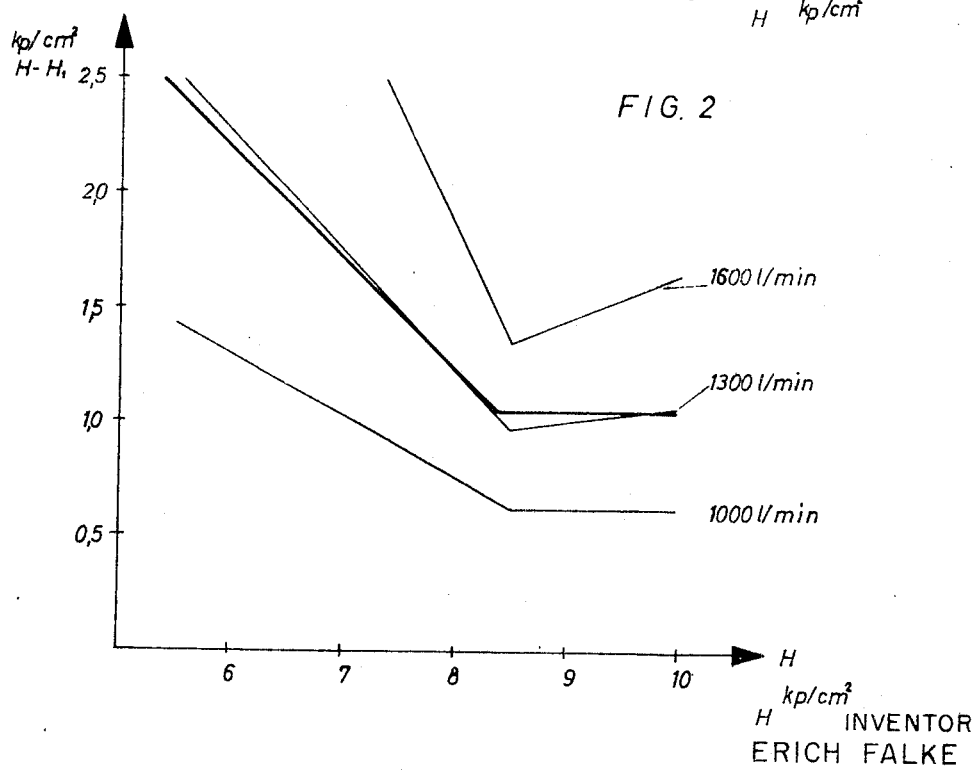

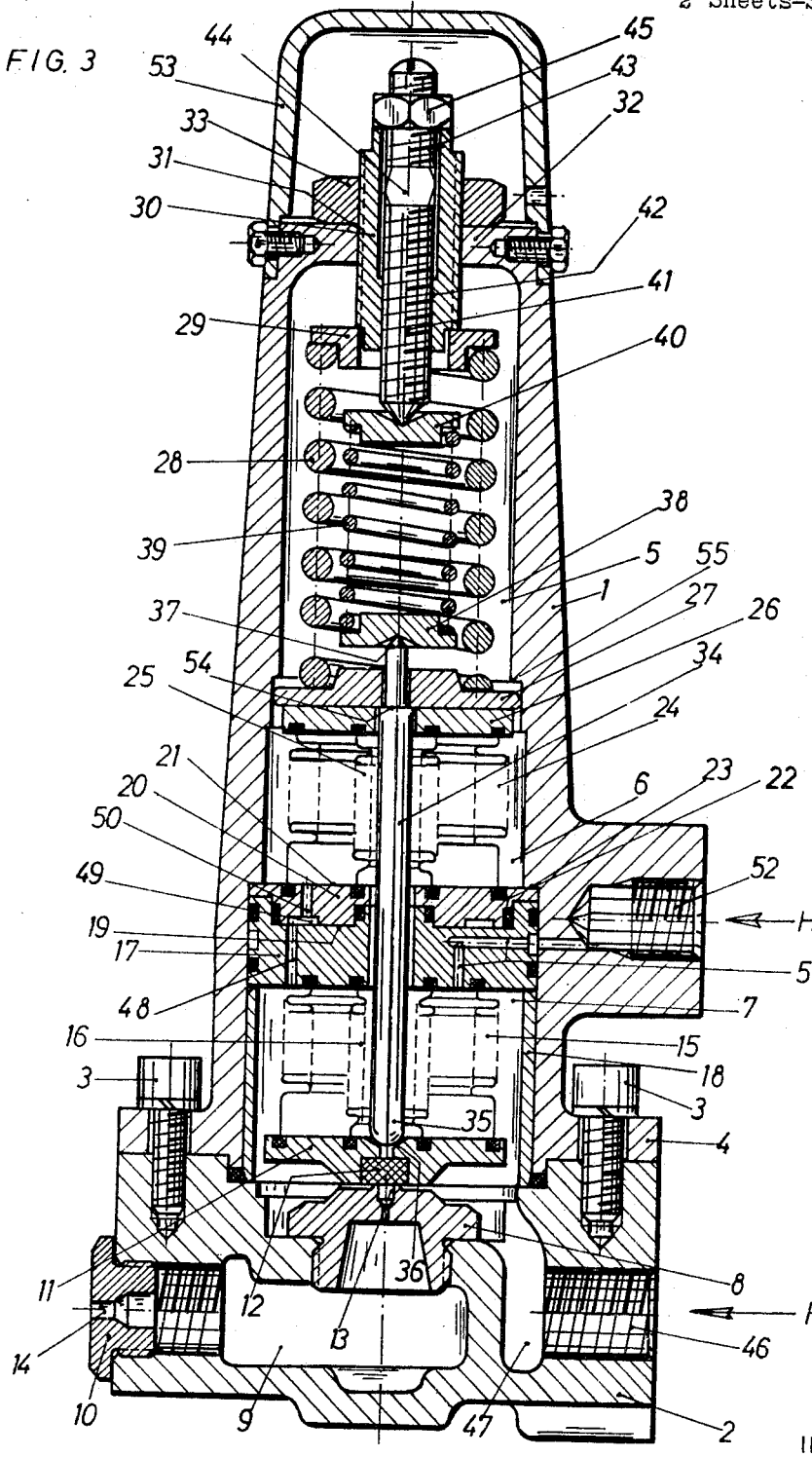

3,512,497
LEAKAGE INDICATING DEVICE FOR AIR BRAKING SYSTEMS
Erich Falke, Munich, Germany, assignor to Knorr-Bremse GmbH, Munich, Germany, a limited liability company of Germany
Filed June 4, 1968, Ser. No. 734,403
Claims priority, application Germany, June 9, 1967, 1,605,272
Int. Cl. B60g 1/26; G01l 7/16
U.S. Cl. 116—55     9 Claims

ABSTRACT OF THE DISCLOSURE

A device for indicating unintentional leakages in the main air line of a railway vehicle air braking system having a driver operated brake controller valve with the air line supplying air to the controller valve having a restricted portion to throttle the air flow. The device is responsive to the unthrottled air pressure and to the difference between the unthrottled air pressure and throttled air pressure. Adjustable springs are provided which are adjusted with respect to the flow characteristic of a particular braking system. The device will give an indication when there is any deviation of the relationship of unthrottled air pressure and difference in pressures to the flow characteristic.

---

The present invention relates to railway vehicle air braking systems, more particularly, to a device for indicating leakage in the main air line of a braking system having a brake controller valve.

A commonly used railway vehicle air braking system provides for the control of long trains of railway cars in response to a single brake controller valve operated by the train operator. As the controller valve is used make-up air must be supplied to the controller valve from a source of air under pressure. In order to ascertain whether there is leakage in the system the air pressure in the system must be under continuous observation. The use of a flow diaphragm for measuring the air pressure in the main air line is not feasible since its use would result in considerable loss of air under pressure. It has therefore been proposed to measure the air pressure in the air supply line to the brake controller valve at those points where the flow of air is restricted and thereby throttled. It is apparent that with equal flow rates of air through the supply line the pressure differences across the flow restrictions will depend on the air pressure at the source. The variation of the pressure difference with respect to a particular air pressure at the source is determined by the flow characteristics of the components of the system such as the various flow lines, valves and the like. Further, every brake controller valve has its own characteristic flow which will effect the variation of the pressure difference with respect to the source pressure.

It is therefore the principal object of the present invention to provide a novel and improved device for indicating leakage in a railway vehicle air braking system.

It is another object of the present invention to provide a leakage indicating device for air braking systems which is also responsive to the flow characteristics of the system.

It is a further object of the present invention to provide a leakage indicating device for air braking systems which indicates any deviation between the relationship of unthrottled pressure and the difference between unthrottled pressure and throttled pressure from an average flow characteristic determined for the system.

It is an additional object of the present invention to provide a novel and improved method for indicating leakage in a railway vehicle air braking system.

In carrying out the present invention there is provided in the air supply line to the brake controller valve a flow restriction so as to produce a throttled pressure. The average flow characteristic for the entire braking system is then determined in terms of the relationship between the non-throttled pressure and the difference between the non-throttled pressure and the throttled pressure. The leakage indicating device which is then connected to the system is adjustable so as to be responsive to the average flow characteristic of the system as determined. The indicating device is essentially responsive to the relationship between the non-throttled air pressure and the difference between the non-throttled pressure and the throttled pressure. The indicator device essentially comprises two pistons each of which is urged to its normal position by a respective adjustable spring. Both pistons are acted upon by non-throttled air pressure but one piston is movable in response to the pressure difference and the other piston is movable in response to the non-throttled air pressure. With this arrangement when the air pressure in the air supply line to the brake controller valve increases above a predetermined value the pressure difference will then act to lift a piston and thus open a valve against the pressure of an adjustable spring. Similarly, as the air pressure decreases the combined air pressure and pressure difference will lift the valve piston against the force of the second adjustable spring.

The method according to the present invention essentially comprises determining the relationship of the non-throttled pressure to the difference between non-throttled pressure and throttled pressure during the operation of the braking system. The deviation between this determined relationship and the relationship of the non-throttled pressure to the difference of the non-throttled pressure and throttled pressure as it exists during operation is then ascertained and this deviation is indicative of any leakage in the system.

Other objects and advantages of the present invention will be apparent upon reference to the accompanying description when taken into conjunction with the following drawings wherein:

FIGS. 1 and 2 are graphs showing diagrammatically relationships between the non-throttled pressure and the difference between non-throttled pressure and throttled pressure with the average relationship for each group of curves being shown in heavier lines; and FIG. 3 is a longitudinal sectional view of the leakage indicator device according to the present invention and adjustable with respect to the relationships illustrated in FIGS. 1 and 2.

Proceeding next to the drawings wherein like reference symbols indicate the same parts throughout the various views a specific embodiment of the present invention will be described in detail.

In FIGS. 1 and 2 there are shown the characteristic curves for various rates of flow of the non-throttled pressure (H) with respect to the pressure differential $(H-H_1)$ between the non-throttled pressure and throttled pressure ($H_1$). The characteristic curves of FIG. 1 are shown for one type of a known brake controller valve employed in the braking system and FIG. 2 show the same characteristic curves but for a different type of known brake controller valve. The characteristic curves were taken at different rates of flow varying from 1,000 litres per minute up to 1,600 litres per minute. For each group of curves in FIGS. 1 and 2 the average curve has been determined and is shown in heavier lines.

The characteristic curves clearly indicate that the slopes of the curves change in the region where the non-throttled air pressure is about 8.5 kg./cm.² . As the pressure difference $H-H'$ decreases and the non-throttled air pressure increases, the characteristic curves for different rates of flow will drop rather steeply in a linear relationship. However after the non-throttled pressure reaches a value of about 8.5 kg./cm.² the flow pressure lines at different rates of flow either remain constant or increase at a slower rate.

Based upon the characteristic curves the average relationship of H to the pressure difference $H-H_1$ can be determined so that with an average amount of supply air to the controller valve the pressure difference during increasing supply line air pressure will decrease linearly up to about H=8.5 kg./cm.² . However, as the pressure H continues to increase the pressure difference will remain substantially constant. By employing an average flow characteristic relationship as represented by this average flow curve the leakage device of the present invention can be readily accommodated by the braking system.

The indicator device of the present invention is illustrated in detail in FIG. 3 and comprises a housing 1 mounted on a base 2 by bolts 3 passing through a flange 4 on the housing. The housing includes a spring chamber 5 and two cylinder chambers 6 and 7 all of which are positioned serially along the longitudinal axis of the housing.

The base 2 is provided with a valve body 8 which controls communication between a base passage 9 and the base connection to the unthrottled air pressure. The passage 9 is provided with an air escape screw 10 having a throttled opening 14 so that the passage of air through this opening makes a sound to provide an audible indication.

A valve piston 11 is positioned within the cylinder chamber 7 and is provided with valve packing 12 which seats upon a valve opening 13 to close this opening when the valve piston is in its closed position. A valve piston 11 is provided with two co-axial spring metal bellows 15 and 16 with each bellows being fastened at one end to the valve piston 11 and at the other end to a stationary partition wall 17 in the housing 1. The partition wall 17 is positioned within the housing by one end of a bushing 18 whose other end rests upon the base 2. The partition 17 has a recess 19 to receive an insert 20 having its peripheral portion seated against an internal annular shoulder 23 formed in the housing 1. In the assembly of the housing, the partition 17 together with the insert 20 are clamped between the bushing 18 and the shoulder 23. Fluid tight seals 22 are provided between insert 21 and a face of the recess 19 to prevent leakage between cylinder chambers 6 and 7.

The upper surface 21 of insert 20 as viewed in FIG. 3 has seated therein the inner ends of a second pair of co-axial spring metal bellows 24 and 25 positioned in the cylinder chamber 6. The outer ends of bellows 24 and 25 are seated in one face of a plate 26 with the other face of the plate 26 supporting an auxiliary piston 27. A spring 28 acts upon the outer face of the auxiliary piston 27 while the other end of the spring is seated on a plate 29 whose position can be adjusted vertically by an adjusting screw 30. The screw 30 is threadably received in a hole 31 formed in the outer end wall 32 of the housing. The screw 30 is retained in an adjusted position by a lock nut 33 positioned against the outer face of the housing end wall 32. The force exerted by the spring 28 on the bellows 24 and 25 can be adjusted by means of screw 30 and lock nut 33.

The auxiliary piston 27 while under the force of spring 28 is movable between an internal shoulder 55 formed in the housing and an external shoulder 54 formed on a thrust rod 34. The thrust rod is slidably mounted for free axial movement in a passage formed in the partition wall 17 and has its lower end 35 seated within a recess on the upper face of the valve piston 11. The upper end of thrust rod 34 is indicated at 37 and is received within a recess in the lower face of a plate 38 acted upon by a spring 39 whose upper end engages a plate 40. The position of plate 40 can be varied and accordingly the force exerted by spring 39 be adjusted by means of an adjusting screw 41 threadedly received in the opening 42 in adjusting screw 30. The adjusted position of screw 41 is maintained by a lock nut 45.

The base 2 of the indicator is provided with a pipe connection 46 which is connected to a line for supplying non-throttled air H from a source of air under pressure not shown in the drawings. The connection 46 communicates with a canal 47 which opens into the lower portion of the cylinder chamber 7. Within the partition 17 in the portion thereof outside of the outer bellows 15 there is a passage 48 which communicates with a groove 49 in the inner surface of insert 20 and from which at least one passage 50 opens into the space between the bellows 24 and 25.

The partition wall 17 is provided with a second passage 51 extending upwardly from between the lower co-axial bellows 15 and 16 to communicate with a pipe connection 52 which is connected to a line for supplying throttled air $H_1$.

The spring chamber 5 as well as cylinder chamber 6 and the space within the inner bellows 16 in cylinder chamber 7 together with the bore for thrust rod 34 are all in communication with the atmosphere.

The spring adjusting screws 30 and 41 and their respective lock nuts are covered by a housing cap 53.

The spring bellows 24 and 25 on the insert 20 and the spring bellows 15 and 16 on the valve piston 11 are readily removable so that they may be interchanged with similar spring bellows having different strength characteristics. By interchanging the respective bellows the device of the present invention may be readily adapted for a wide range of flow characteristics of a braking system. Each pair of spring bellows may also be constructed as a single integral structural unit so as to greatly facilitate interchanging a bellows unit with another unit in order to vary the characteristics of the indicator device.

The functioning of the leakage indicating device as described above will next be described under operating conditions.

Non-throttled air from the braking controller valve supply line will be introduced into the cylinder chamber around the exterior of outer spring bellows 15 through pipe connection 46 and passage 47. The space between the co-axial bellows 15 and 16 is supplied with throttled air $H_1$ through passage 51 from the pipe connection 52. The valve piston 11 is therefore urged away from valve seat 13 to the open position under the force exerted by the pressure difference of $H-H_1$.

The space between co-axial bellows 24 and 25 located in cylinder chamber 6 will be supplied with non-throttled air pressure H through passages 48, 50 and groove 49 in partition wall 17 and insert 20. The force exerted by non-throttled air H will urge plate 26 upwardly against auxiliary piston 27 which in turn is acted upon on its outer face by the adjusted pressure F of spring 28. Accordingly, a differential pressure $H-F$ acts upon auxiliary piston 27.

The valve piston 11 is urged into the closed position by means of the force exerted by the thrust rod 34. The force exerted by thrust rod 34 is comprised of the adjusted force $F_1$ of spring 39 exerted through plate 38 and by the differential force $H-F$ acting upon auxiliary piston 27 which in turn is exerted upon the shoulder 54 of thrust rod 34. It is apparent that valve 8 will remain closed by the valve piston 11 as long as the sum of forces $F_1$ and $H-F$ is greater than the pressure difference $H-H_1$. In the event the pressure of the non-throttled air H increases sufficiently to lift auxiliary piston 27 against the force of spring 28 and off of the shoulder 54 of thrust rod 34, then only spring 39 will be acting upon thrust rod 34 and against valve piston 11. In opposition to the force of the spring 39 will be only the pressure differential $H-H_1$. Should the relationship between H and $H-H_1$ vary, such as, for example, as H increases the pressure difference $H-H_1$ falls above the average characteristic curve, then the pressure differential will not be sufficient to hold valve piston 11 in the closed position and valve piston 11 will be lifted from its valve seat. The non-throttled air will then flow through passages 47 in base 2, through valve body 8, passage 9, and out through opening 14 of the air venting screw 10 with a noise which produces an audio signal.

It will be apparent that as the non-throttled air pressure increases beyond a certain value which as may be seen in FIGS. 1 and 2 is 8.5 kg./cm.², the differential pressure $H-H_1$ will lift the valve piston 11 to open valve 8 against the force of the adjustable spring 39. Where the non-throttled air pressure decreases below this value of 8.5 kg./cm.² the sum of the non-throttled air pressure H and the differential pressure $H-H_1$ will lift the valve piston 11 against the pressure of the other adjustable spring 28.

By adjusting springs 28 and 39 the pressure responsive characteristics of the leakage indicating device can be adapted to the average flow characteristic of the air braking system when it is equipped with different kinds of operator actuated brake controller valves. The linear downwardly sloping portion of the curve with decreasing pressure difference $H-H_1$ and increasing non-throttled air pressure H is adjusted up to the transition point (which in FIGS. 1 and 2 is 8.5 kg./cm.²) by adjusting of spring 28. The constant or upwardly sloping curve after this transition point occurring upon further increase of non-throttled air pressure H is obtained by adjusting of the spring 39.

Thus it can be seen that the present invention has provided a leakage indicating device for air braking systems which can be correlated to the flow characteristic of the particular air braking system in which the device is to be used. The responsiveness of the device can be varied by adjusting one or both adjusting springs or by interchanging one or both of the pairs of spring metal bellows. Upon determining the flow characteristic for any air braking system in terms of the non-throttled air pressure and the difference between non-throttled air pressure and throttled air pressure, the device will indicate any deviation from this predetermined relationship. Any deviation from this relationship will be indicated by an audio signal produced by the escape of air through a vented opening. It is apparent that other forms of indicators may be employed which respond to such a deviation. The adaptability of the device or monitor of the present invention eliminates the necessity for replacing such a device whenever the flow characteristics of the braking system are changed such as would occur by use of a different brake controller valve.

It will be understood that this invention is subject to modification in order to adapt it to different uses and conditions and, accordingly, it is desired to comprehend such modification within this invention.

What is claimed is:

1. A device for indicating leakage in a railway vehicle air braking system having a brake controller valve, and comprising first means connected to the air supply line of the brake controller valve and responsive to the unthrottled pressure therein, said first means including a piston valve and a first adjustable spring acting against said piston valve to urge said piston valve into the closed position, second means connected to the air supply line of the brake controller valve and responsive to the difference between the unthrottled and throttled air pressures, said second means including a second adjustable spring acting upon said first means so that both said first and second means urge said piston valve to the closed position against the force of the unthrottled air pressure, and means responsive to said first and second means for indicating deviation of the relationship of unthrottled pressure and said pressure difference from a previously ascertained flow characteristic of the braking system.

2. A device as claimed in claim 1 and having a passage therein connected to unthrottled air line pressure and opening to the atmosphere, said passage having a valve seat therein with said piston valve normally resting on said seat to close said passage, said first and second springs being so adjusted that when the unthrottled air pressure increases above a predetermined value the difference between the unthrottled and throttled pressures will move the piston valve against said first means and when said unthrottled air pressure decreases below said value the pressure difference will move said piston valve against said second means.

3. A device as claimed in claim 2 with said second means comprising an auxiliary piston with the unthrottled air line pressure acting on one side thereof and said second adjustable spring acting on the other side thereof, and a thrust rod between said auxiliary piston and said piston valve to transmit the force exerted by said second spring against said auxiliary piston to said piston valve whereby both said first and second springs urge said piston valve to the closed position.

4. A device as claimed in claim 3 and further comprising wall means between said auxiliary piston and said piston valve, a first pair of co-axial spring bellows between said auxiliary piston and said wall means, and a second pair of co-axial spring bellows between said piston valve and said wall means.

5. A device as claimed in claim 4 wherein each pair of bellows comprises a single structural unit.

6. A device as claimed in claim 3 with said thrust rod being mounted within said device for free longitudinal movement therein.

7. In a railway vehicle air braking system, the combination of a brake controller valve operated by the vehicle operator, an air supply line connected to a source of air under pressure and to said brake controller valve to supply said controller valve with air, means within said air supply line for throttling the flow of air therein, first means connected to the unthrottled side of said air supply line and responsive to the unthrottled pressure therein, second means connected to said air supply line on both sides of said throttling means and responsive to the difference between the unthrottled and throttled air pressures, and means responsive to said first and second means for indicating deviation of the relationship of unthrottled pressure and said pressure difference from a previously ascertained flow characteristic of the system.

8. A method of indicating leakage in a railway vehicle air braking system having a brake controller valve supplied with air through a line connected to a source of pressure and comprising the steps of throttling the air flowing through the air supply line, determining within the braking system the flow characteristics of unthrottled air pressure with respect to the difference of unthrottled air pressure and throttled air pressure, indicating the relationship of the unthrottled air pressure to the difference of unthrottled air pressure and throttled air pressure during the operation of the braking system, ascertaining deviation between the determined flow characteristic and the relationship of unthrottled pressure to the difference of unthrottled air pressure and throttled air pressure whereby any such deviation is indicative of leakage in the braking system.

9. A method as claimed in claim 8 with the flow characteristic being determined for difference rates of flow of air and using the average of said characteristics as a basis for ascertaining leakage.
acteristic being determined for difference rates of flow of air and using the average of said characteristics as a basis for ascertaining leakage.

References Cited

UNITED STATES PATENTS

| | | | |
|---|---|---|---|
| 959,209 | 5/1910 | Dukesmith | 116—55 |
| 1,837,598 | 12/1931 | Thomas et al. | 116—55 |
| 3,288,101 | 11/1966 | Miller | 116—55 |

LOUIS R. PRINCE, Primary Examiner

W. A. HENRY II, Assistant Examiner

U.S. Cl. X.R.

73—40.5; 116—70